United States Patent [19]

Gugel et al.

[11] 4,422,697

[45] Dec. 27, 1983

[54] ROTARY ROLLER BEARING CONNECTION WITH A FREE CENTER

[75] Inventors: Georg Gugel, Nuremberg; Theodor Kaiser, Höchstadt, both of Fed. Rep. of Germany

[73] Assignee: INA Walzlager Schaeffler KG, Fed. Rep. of Germany

[21] Appl. No.: 300,240

[22] Filed: Sep. 8, 1981

[30] Foreign Application Priority Data

Sep. 10, 1980 [DE] Fed. Rep. of Germany ....... 3034008

[51] Int. Cl.³ ............................................. F16C 19/49
[52] U.S. Cl. ................................................... 308/175
[58] Field of Search ............... 308/174, 176, 175, 173, 308/189 R, 219

[56] References Cited

U.S. PATENT DOCUMENTS

| | | | |
|---|---|---|---|
| 3,652,141 | 3/1972 | Hüsten et al. | 308/174 |
| 4,126,361 | 11/1978 | Böttner et al. | 308/174 |
| 4,129,343 | 12/1978 | Janssen | 308/173 |
| 4,269,460 | 5/1981 | Orain | 308/174 |

*Primary Examiner*—Lenard A. Footland
*Attorney, Agent, or Firm*—Hammond, Littell, Weissenberger and Muserlian

[57] ABSTRACT

A rotary roller bearing connection with a free center comprising two concentric races, one race having a circular slot open towards the other race, the other race having a circular protrusion engaging the said slot with spacing on all sides, cylindrical rollers between the outer surface of the protrusion and the corresponding slot surface to absorb radial forces, a row of rolling elements between the face of the protrusion and the corresponding slot surfaces to absorb axial forces, of which at least the bearing row transmitting the main axial load is cylindrical rollers, and sections of circular arc form whose radii correspond at least to the radius of rolling elements disposed in the retaining row being provided in the area of the retaining row facing the bearing row and absorbing the lifting, tilting movement both at the transition of the protrusion to its associated race and at transition of the track area of the corresponding slot to the slot bottom.

7 Claims, 5 Drawing Figures

ROTARY ROLLER BEARING CONNECTION WITH A FREE CENTER

STATE OF THE ART

Rotary roller bearing connections have to absorb not only axial and radial loads, but also high tilting movements as well and the constantly increasing requirements that such roller bearings must meet lead due to the high overloads during continued operation of the bearing to the occurence of incipient cracks in the races which are not fully supported by the connecting structure in the transition area from the roller track to the associated race resulting in eventual fracturing of the race and destruction of the bearing.

The said incipient cracks are a consequence of the notch effect occuring in this area of the race subjected to bending stresses. The rounded surfaces in the transitions from the roller track to the race are limited in their dimensions for design reasons and therefore, a form factor $a_k$ on the order of a magnitude of 2 to about 5 must be contended with when considering the notch effect.

The known attempts to reduce the high bending stresses caused by the notch effect as well as other effects has until now resided in strengthening the races but this leads to additional increases in the form factor $a_k$ as well as a considerable weight increase and higher cost of the bearing. Moreover, the strengthening did not significantly reduce the risk of fractures occuring.

OBJECTS OF THE INVENTION

It is an object of the invention to provide novel rotary roller bearing connections with a free center wherein the bending stresses on the transitions from the roller tracks to the races are avoided in a simple and economical manner.

This and other objects and advantages of the bearing of the invention will become obvious from the following detailed description.

THE INVENTION

The invention is directed to a rotary roller bearing connection with a free center comprising two concentric races, one race having a circular slot open towards the other race, the other race having a circular protrusion engaging the said slot with spacing on all sides, cylindrical rollers between the outer surface of the protrusion and the corresponding slot surface to absorb radial forces, a row of rolling elements between the face of the protrusion and the corresponding slot surfaces to absorb axial forces, of which at least the bearing row transmitting the main axial load is cylindrical rollers, and sections of circular arc form whose radii correspond at least to the radius of rolling elements disposed in the retaining row being provided in the area of the retaining row facing the bearing row and absorbing the lifting, tilting movement both at the transition of the protrusion to its associated race and at transition of the track area of the corresponding slot to the slot bottom. The said construction reduces the form factor $a_k$ at the transition from the roller track to the race to approximately one which means the notch effect in this area is substantially avoided with a reduction in the risk of the race being fractured and the bearing being destroyed.

One preferred embodiment of the invention accomplishes this purpose by providing a retaining row with balls rolling in ball grooves approximately fitting the ball contour between the protrusion and the corresponding slot, the ball grooves transitioning without a shoulder into cylindrical outer surfaces of the associated races. The transition without a shoulder together with the large radius prevents crack formation in the race without any increase in weight and without additional costs.

In a second embodiment of the invention, the retaining row contains cylindrical rollers rolling on track wires of an approximately semicircular cross-section with a radius equal to or larger than half the roller length, the said wires being inserted into appropriate grooves in the protusion and in the corresponding slot and the said grooves pass without any shoulder into cylindrical outer surfaces of the associated races. It is also possible for the retaining row to be comprised of cylindrical rollers rolling on plane-parallel tracks of the protrusion and of the slot and in radial extension of the tracks there is adjacent sections of a circular arc shape whose radii correspond to at least the roller radius.

But it is also possible for the retaining row to contain cylindrical rollers rolling on plane-parallel tracks of the protrusion on the one hand and of the slot on the other, there being adjacent, in radial extension of the tracks, sections of circular arc shape whose radii correspond at least to the roller diameter.

However, the described disadvantages of the notch effect are not limited to the retaining row and these disadvantages may also lead to the destruction of the roller bearing in the bearing row if the races there are subjected to bending stresses. Therefore, in a referred embodiment of the invention, the protrusion face of the race forming the track for the cylindrical rollers of the bearing row is in one plane with the face of this race. This reduces notch tensions in the area of the bearing row also if, as in the embodiment example shown, the race is subjected to bending stress. This also results in the additional special advantage tha the race can be designed thinner in the axial direction which brings with it a considerable weight saving, given the size of these races. To avoid the notch effect in the bearing row, the race may also be designed so that the radial surface of the invention of the one race forming the track for the cylindrical rollers of the bearing row, transitions into the race face by a roundening having a radius equal to or larger than the radius of the cylindrical rollers.

Finally, it is also within the scope of the invention for the tracks for the cylindrical rollers of the bearing row to be formed by track wires of approxiately semicircular section with a radius equal to or large than half the roller length, said track wires being inserted into appropriate grooves in the protusion and in the slot, said grooves transitioning without shoulder into cylindrical outer surfaces of the associated races. This design provides in a simple manner a roller bearing for the absorption of large axial forces while avoiding separate hardening of the races by the insertion of the hardened track wires, and still eliminating the notch effect.

Referring now to the drawings.

Figure 1:
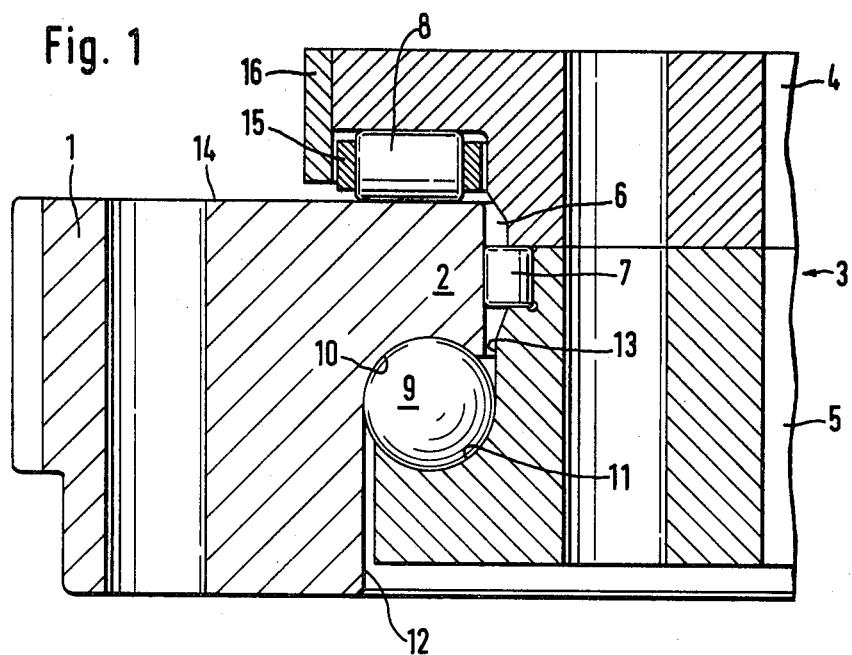
FIGS. 1 and 2 are partial cross-sectional views of 2 different embodiments of the bearing connection of the invention with balls in the retaining row.

In the figs., all the roller bearings shown are comprised of race 1 with a protrusion 2 and race 3 which is comprised of bearing ring 4 and retaining ring 5 jointly forming slot 6. Cylindrical rollers 7 are disposed between slot 6 and protrusion 2 for absorption of radial forces and cylindrical rollers 8 in the bearing row absorb the main axial load.

Figure 2:
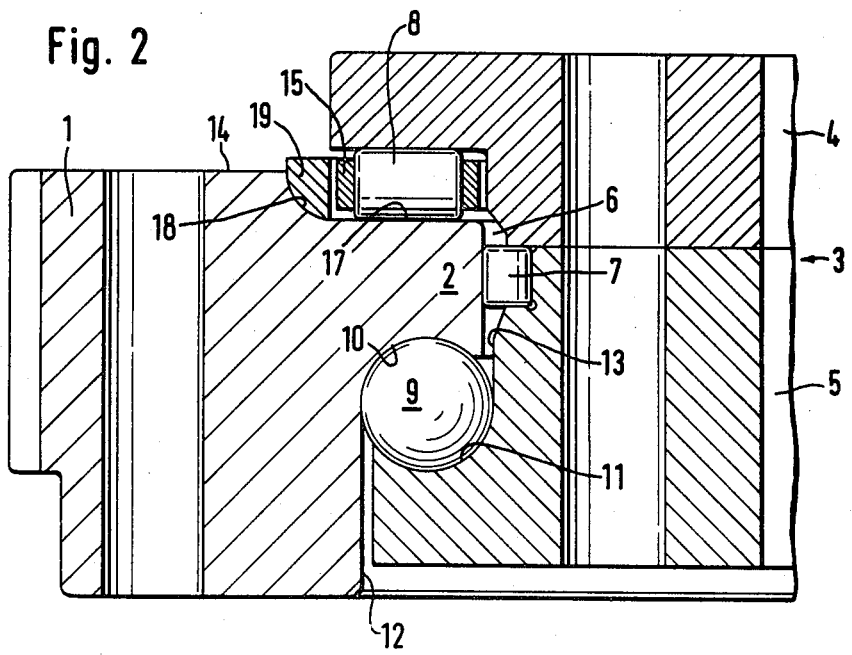

In the embodiments of FIGS. 1 and 2, balls 9 rolling in ball grooves 10 which approximately fit the ball contour in the protrusion 2 and ball grooves 11 in the slot 6 are provided in the retaining row. The ball grooves 10, 11 transition without shoulder into the cylinder outer surfaces 12 and 13 of race 1 and retaining ring 5, respectively.

In FIG. 1, the track for the cylindrical rollers 8 of the bearing row is formed directly by the face 14 of race 1 and ring 16 is fastened to the bearing ring 4 as contact surface for the cage 15 guiding the cylindrical rollers 8. In the embodiment of FIG. 2, the radial surface 17 of race 1, forming the track for the cylindrical rollers 8 of the bearing row, transitions by roundening area 18 into face 14, the rounded surface 18 having a radius corresponding approximately to the diameter of the cylindrical rollers 8. An annular filler 19 is inserted in the roundening 18 of race 1 to guide cage 15.

Figure 3:
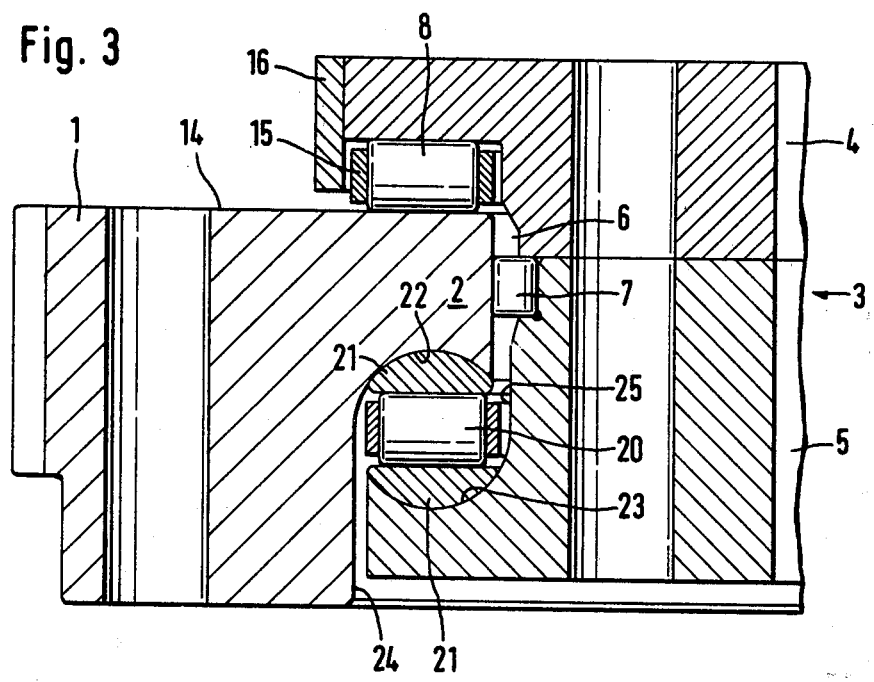
FIGS. 3 and 4 are partial cross-sectional views of 2 different embodiments of the bearing connection of the invention with cylindrical rollers in the retaining row.

FIG. 3 shows an embodiment similar to FIG. 1 with regard to the bearing row absorbing the main axial load. In the retaining row, cylindrical rollers 20 are dispoed which roll on track wires 21 with an approximately semi-circular section. The track wires 21 are inserted into corresponding grooves 22 and 23 which transition without shoulder into the outer surfaces 24 and 25 of race 1 and retaining ring 5, respectively.

Figure 4:
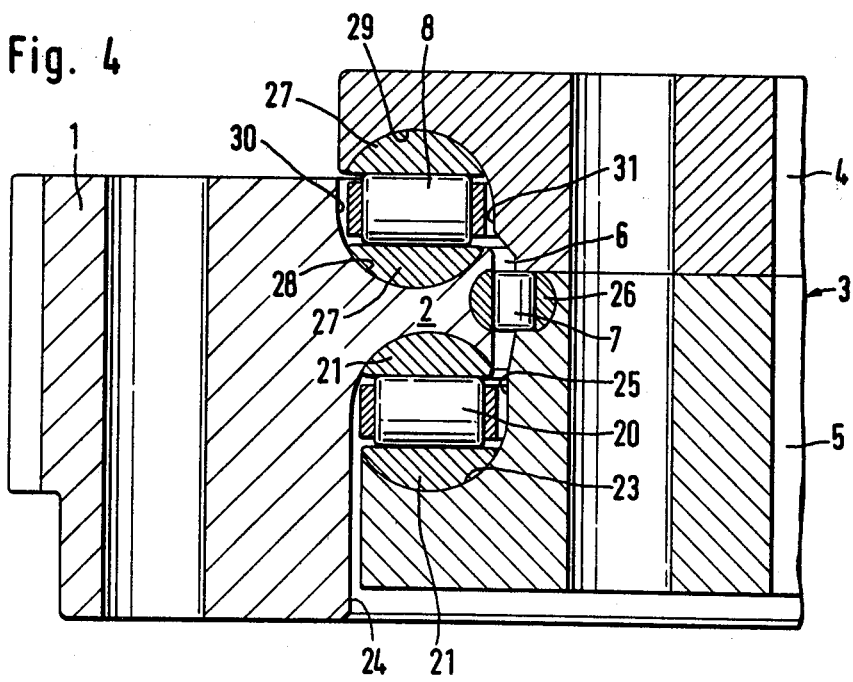

The embodiment of FIG. 4, corresponding to FIG. 3 with regard to the retaining row, is provided with both cylindrical rollers 7 absorbing the radial forces and the cylindrical rollers 8 disposed in the bearing row roll on track wires 26 and 27, respectively, the latter being inserted in corresponding grooves 28 and 29 of race 1 and bearing ring 4, respectively. According to the invention, here too, grooves 28 and 29 of the bearing row transition without shoulder into the cylinder outer surfaces 30 and 31 of associated race 1 and bearing ring 4, respectively.

Figure 5:
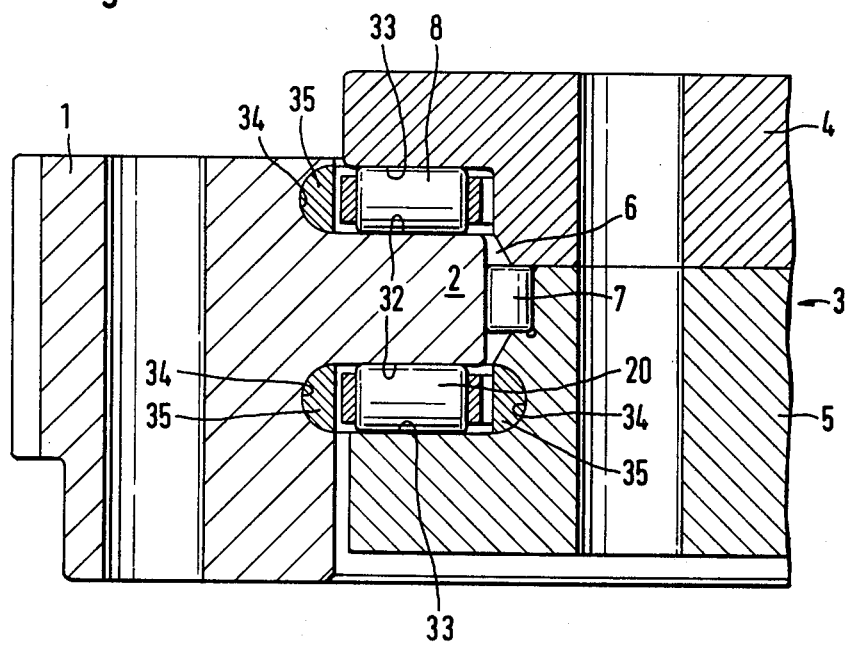
FIG. 5 is a partial cross-sectional view of another embodiment of the bearing connection of the invention.

The modified embodiment of FIG. 5 contains cylindrical rollers 8 in the bearing row and cylindrical rollers 20 in the retaining row, both rolling on plane-parallel tracks 32 and 33 of protrusion 2 and in the slot 6. To avoid the notch effect there is provided in radial extension of tracks 32 and 33, both in the bearing and the retaining row, sections 34 of ciruclar arc form whose radii correspond to the radius of the cylindrical rollers 8 and 20. As already described in FIG. 2, fillers 35 are inserted in the circular arc-shaped sections 34 of race 1 and retaining ring 5 to guide the cage here also.

Various modifications of the bearing connection of the invention may be made without departing from the spirit or scope thereof and it is to be understood that the invention is intended to be limited only as defined in the appended claims.

We claim:

1. A ring-rolling bearing connection with a free center comprising two concentric races, one race having a circular slot open towards the other race, the other race having a circular protrusion engaging the said slot with spacing on all sides, and crylindrical rollers being provided between the outer surface of the protrusion, on the one hand, and the corresponding surface in the slot, on the other hand, to absorb radial forces, and one row each of rolling elements between the corresponding faces of the protrusion, on the one hand, and corresponding faces of the slot, on the other hand, to absorb axial forces, of which at least the row transmitting the main axial load consists of cylindrical rollers, characterized in that, in the area of a retaining row of rolling elements facing the rolling elements and absorbing only the lifting tilting moment, both on the protrusion's adjacent radial surface its axially facing retaining row, and at the slot portion opposite the said retaining row there are provided sections of circular arc form whose radii correspond at least to the radius of the rolling elements disposed in the retaining row.

2. A bearing connection of claim 1 wherein the retaining row is comprised of balls rolling in ball grooves approximately fitting the contour provided in the protrusion and in the slot, the ball grooves transitioning without a shoulder into cyclindrical outer surfaces of their associated races.

3. A bearing connection of claim 1 wherein the retaining row is comprised of cylindrical rollers rolling on track wires of approximately semi-circular cross-section with a radius at least as large or one half the roller length, said track wires being inserted in corresponding grooves in the protrusion and in the slot and transitioning without shoulders into cylindrical outer surfaces of their associated races.

4. A bearing connection of claim 1 wherein the retaining row is comprised of cylindrical rollers rolling on plane-parallel tracks of the protrusion and of the slot and providing adjacent in radial extension of the tracks circular arc-shaped sections whose radii is at least a great as the roller radius.

5. A bearing connection of claims 1, 2, 3, or 4 wherein the face of the protrusion forming the track for cylindrical rollers of the bearing row lies in one plane with the face of the race.

6. A bearing connection of claim 1 wherein the radial surface of the protrusion of the race forming the track for the cylindrical rollers of the bearing row transitions through a roundening into the face of the race, said roundening having a radius at least equal to the diameter of the cylindrical rollers.

7. A bearing connection of claim 1 wherein the tracks for the cylindrical rollers of the bearing row are formed by tracks wires of approximately semi-circular section with a radius at least equal to half the roller length, said track wires being inserted into corresponding grooves of the protrusion and of the slot said grooves transitioning without shoulder into cylinder outer surfaces of their associated races.

* * * * *